F. A. CARTER.
ARTIFICIAL TOOTH.
APPLICATION FILED JAN. 22, 1910.
998,600.
Patented July 25, 1911.
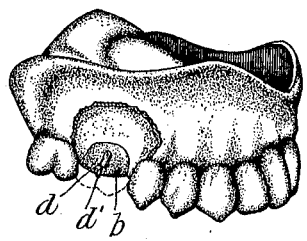
Fig. 4.
Fig. 5.
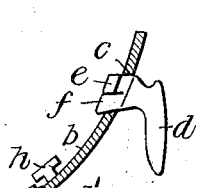
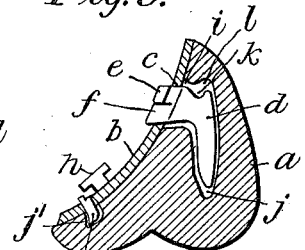
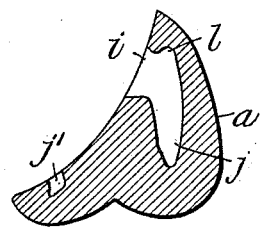
Fig. 2.
Fig. 1.
Fig. 3.
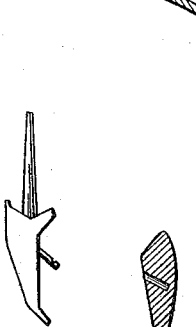
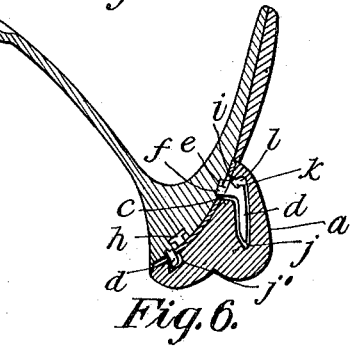
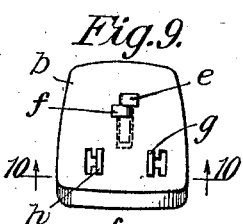
Fig. 7. Fig. 8.
Fig. 6.
Fig. 9.
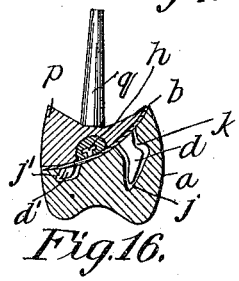
Fig. 16.
Fig. 13.
Fig. 12. Fig. 15.
Fig. 10.
Fig. 14.
Fig. 11.
Witnesses
Leonard W. Novander
George E. Higham
Inventor
Francis A. Carter
By Brown Williams
Attorneys
COLUMBIA PLANOGRAPH CO., WASHINGTON, D. C.

UNITED STATES PATENT OFFICE.

FRANCIS A. CARTER, OF CHICAGO, ILLINOIS.

ARTIFICIAL TOOTH.

998,600.　　　　　　　Specification of Letters Patent.　　Patented July 25, 1911.

Application filed January 22, 1910. Serial No. 539,499.

*To all whom it may concern:*

Be it known that I, FRANCIS A. CARTER, a citizen of the United States, residing at Chicago, in the county of Cook and State of Illinois, have invented a certain new and useful Improvement in Artificial Teeth, (Case 1,) of which the following is a full, clear, concise, and exact description, reference being had to the accompanying drawings, forming a part of this specification.

My invention relates to artificial teeth and the means for mounting them.

It has particularly to do with porcelain teeth, or teeth of like material which are to be fastened to a metal backing or support.

The primary objects of my invention are to provide a means whereby the porcelain fronts of the teeth may be held securely in position and at the same time a means which will facilitate the work of forming the metal part of a crown, bridge, or plate to which the tooth fronts are to be attached.

It has particularly to do with individual metal tooth backings, porcelain teeth, or teeth of like material, which are to be fastened to a metal backing or support thereon, and to cast base plates, more especially metal plates, which cannot be soldered, such as aluminum.

It is a particular object of my invention to provide a simple and effective means of fastening together very securely all of the parts which go to make up the metal frame work upon which the tooth fronts are mounted.

It is a further object of my invention to provide means for detaching the tooth fronts from their metal backs while certain of the work upon and with the metal backs is under way, and also a simple and effective means whereby the tooth fronts may, when desired, be firmly and securely attached to the tooth backs.

While my invention accomplishes these objects I do not sacrifice in any degree the strength of the porcelain tooth fronts but instead the tooth fronts are protected by the novel construction of the metal tooth backing and the tooth front itself, owing to the bent cutting edge. It is necessary to provide a hole or depression in the tooth fronts by means of my invention. Access to this necessary opening is wholly by way of a small hole in the back of the tooth front. The opening is, therefore, in the side of a broad, flat part of the tooth front with the result that the tooth front is not likely to be cracked or split open either in the work of making up plates, bridges, or crowns, or in the use of the person in whose mouth the work is fitted.

In accordance with my invention I provide for each porcelain tooth front a thin backing of gold or aluminum, or other suitable metal, the backing being fitted closely to the back of the porcelain tooth front. Such metal backs may be manufactured in quantities and one such back furnished to the dentist with each tooth front, or the dentist may himself make the metal backing for each tooth. In either event the metal backing is provided with L shaped prongs or projections adapted to extend into correspondingly shaped cavities in the porcelain tooth fronts. The prong may be attached to the metal backing plate in any desired manner. I shall describe in further detail a particular method of attaching the prong to the backing piece. In accordance with my invention I prefer to provide each backing plate also with one or more protuberances which later are embedded in the metal frame of the bridge or plate.

It will be seen that the artificial teeth designed and constructed in accordance with my invention are adapted for use in prosthetic dentistry of all kinds, including crowns, bridges and plates, either partial or full.

Generally stated the object of the invention is to provide a compact and convenient form of teeth, strong and durable, simple in character, positive in action, and of small cost to manufacture.

The various features of my invention will be more clearly understood by reference to the accompanying drawings in which—

Figure 1 illustrates in cross-section a bicuspid tooth front and backing piece of my invention; Fig. 2 shows the backing piece of Fig. 1 with its prongs; Fig. 3 shows a porcelain tooth front adapted to be mounted upon the backing shown in Fig. 2; Fig. 4 is a perspective view of a full upper set of artificial teeth mounted on a plate, with one tooth or porcelain facing removed therefrom; Fig. 5 is a front view of the molar tooth removed from the plate of Fig. 4, the opening for the reception of the prongs being indicated in dotted lines; Fig. 6 is an enlarged cross-sectional view taken on a line through that tooth of the plate of Fig. 4 which has been removed therefrom; Fig. 7 is a side view of a crown to which is attached the backing piece of my invention, a modified form of prong being herein shown; Fig. 8 shows in cross-section the tooth front adapted to fit the backing shown in Fig. 7; Fig. 9 shows an enlarged back view of the backing of an incisor tooth; Fig. 10 is a cross-sectional view of the backing of Fig. 9 taken on line 10—10 of Fig. 9; Fig. 11 is a similar cross-sectional view intended to illustrate a modification of the protuberance or anchor by means of which the backing is attached to the plate or other framework; Fig. 12 shows a piece of bridgework consisting of seven teeth, four of the teeth being shown in place and three of them being removed; Figs. 13, 14 and 15 respectively show a cross-sectional view of the cuspid tooth front removed from the bridge of Fig. 12, an incisor shown in rear elevation removed from the same plate, and a bicuspid tooth front shown in cross-sectional view and removed from the same bridge; Fig. 16 shows in cross-section a bicuspid crown with a cast abutment showing the double anchorage of my invention.

Referring first to Fig. 1, the porcelain tooth face or tooth front is shown at $a$. It will be noted that the inner surface of the tooth face or front is quite smooth and regular, whereby it is a simple matter to bend and shape the thin metal backing $b$ to fit this rear or inner surface of the tooth front. Through a suitable opening in the backing at $c$ is thrust the fastening part of an L-shaped prong $d$. The fastening part of this prong is split, as shown, and the split ends are bent or riveted over, one in each direction as shown at $e$ and $f$ of Fig. 9. Speaking generally, it may be said that this prong is riveted to the backing piece, although it may be attached in any suitable manner. For bicuspid and molar teeth I prefer to supplement the main prong $d$ by an auxiliary prong or projection $d'$. This may be attached, as shown in Fig. 1, to the backing piece in the same general manner as is the main prong $d$. For use in connection with plate or bridge work, I prefer also to form a protuberance on the back or inside of the tooth backing $b$. I preferably make the protuberance in the form of T-shaped pieces, which are punched out of the thin metal of the backing piece itself and which are turned inwardly to face each other, as best shown in Figs. 9 and 10, where the T-shaped protuberances or studs are marked $g$ and $h$, respectively. These protuberances or studs are turned up on the back or inside of the backing piece, as shown, the prongs being on the outside of the backing piece, as is also the auxiliary prong when used. All of the teeth, no matter what their shape or size, are thus provided on the inside with thin metal backing pieces and with the prongs which are used in anchoring the tooth front to the backing pieces. The backing pieces and prongs are shaped and placed in conformity with the particular tooth face with which they are associated.

The tooth face is attached to the associated backing piece by inserting the prongs $d$ through the opening $i$ on the inside of the porcelain tooth face. The tooth face is then slipped upwardly and inwardly with a slight turning motion until the tooth face is brought into register with the backing piece. When two prongs are used, as in Fig. 1, it is of course necessary to slip the auxiliary cavity $j'$ over the auxiliary prong $d'$ as well as to slip the larger cavity $j$ over the main prong $d$. The cavities $j$ and $j'$ in the tooth front have previously been filled or partly filled with cement. As the prongs are forced into the cavities they displace the cement which fills the interstices between the prongs and the walls of the cavities. As the cement hardens it binds the tooth face or front firmly in position and securely to the prongs and backing piece.

It will be noted that I provide at the upper turn of the main prong $d$ a slight depression $k$. Immediately opposite this depression $k$, I also form a similar depression in the cavity $j$, this latter depression being marked $l$. The result is that the cement in being forced upwardly and outwardly from the lower part of the cavity $j$ fills the depressions $k$ and $l$ on both sides so as to form a small ball or head of cement, which when hardened serves securely to bind or wedge the prongs in position within the cavity $j$ to minimize the likelihood of forcing the tooth face from its back piece.

Now, to review briefly the steps followed in forming a plate, the advantages of my invention will become quite apparent. Taking, for example, the making of a cast plate in conjunction with the artificial teeth of my invention, the preliminary preparations do not differ from those ordinarily made in connection with similar work. After the model is prepared, a thin piece of beeswax is pressed over the entire surface of the model. This beeswax is slightly warm, whereupon the teeth, that is to say the tooth fronts of my invention, together with their backings, are properly mounted and adjusted in position upon the wax form. Each facing of porcelain with its metal backing is stuck to the wax as it lies upon the model, the protuberance or protuberances $g$ and $h$ upon the back or inside of each backing piece, being embedded in the wax. Additional wax is melted and flowed around the teeth and backing pieces until all are fixed in position corresponding with the positions to be occupied in a plate, the wax taking the form of the metal part of such a finished plate.

To make sure that the occlusion is absolutely correct, the beeswax form is removed from the model, together with the porcelain teeth and backing which are mounted thereon. This beeswax form which duplicates the form of the finished plate is chilled and tried in the patient's mouth. The teeth being finally adjusted in this way, the beeswax form is removed from the patient's mouth and replaced upon the model, where it is made fast with hot beeswax. The whole wax form is then chilled again, whereupon the tooth fronts or facings are removed, each from its backing piece, care being taken to leave each of the backing pieces precisely in the proper position upon the beeswax form.

We are now ready for the process of investment and casting. This is done in the ordinary way by investing the wax form in a flask filled with investment compound. The flue opening having been cut, the mold containing the wax form, to which the metal backings still cling, is heated, whereupon the wax is melted and run out through the sprue hole. Molten metal is now poured into the mold to cast the plate. It will be apparent that the backings of the various tooth fronts having been fixed in position within the investment compound by the wax form, the hot molten metal when it runs into the mold, will flow in and about the protuberances on the inside of each of the tooth backings, thus binding each tooth backing securely and permanently in place upon the outer rim of the cast plate. The plate is now polished in the usual way, whereupon each tooth front or facing is cemented in position upon the proper tooth backing in the manner previously described.

Thus by means of the process which is described above in detail the projections extending inwardly from the individual backing plates are surrounded by the material of the mounting plate, and the backing plates are securely retained in proper position upon the mounting plate to receive the tooth facings. This process is of particular value for use in connection with mounting plates made of metal that cannot be soldered to the backing plates, as, for example, aluminum, and is also very effective for securing the individual backing plates to mounting plates made of hard rubber and other similar material.

It will be seen that the use of my invention in work of this character provides a safeguard against checked, cracked or discolored facings resulting either from soldering or casting operations. My invention affords also a means for correcting the shade of the tooth front and for the replacement of broken tooth faces whether caused by faulty construction or by extraneous causes. The same general line of procedure applies in the case of crowns and bridge work as in the case of plate work. The method in which the tooth backings are attached to the finished plate of cast metal is shown in Fig. 6, this figure showing also the vulcanized facing $m$ which ordinarily is applied to the outer rim of the plate above the teeth in order to simulate natural gums.

An inspection of Figs. 12, 13, 14 and 15 will show that in bridge work the operation conforms closely to those already described in connection with plate work. Fig. 12 shows a piece of bridge work terminating at one end in a Richmond crown and provided near the other end with another abutment of the same general form. In this class of work, as in plate work, a wax pattern is secured, to which the backing pieces are stuck. The outer sides of the backing pieces are then invested while held in proper relative positions upon the wax pattern, the tooth faces having been removed as before after which the procedure is as described above in connection with casting plates. The wax is then removed from the rearward side of the backing pieces, thus exposing the reverse side of the backing pieces, whereupon they may be soldered together and to the abutments to form a rigid and substantial mounting for the tooth faces. In order to mount the tooth faces the investiture is removed from the outside of the backing pieces now soldered together, thereby exposing the prongs of the backing pieces. Here again the tooth faces are slipped into place upon the backing pieces and cemented firmly in final position. Fig. 13 shows in cross-sectional view a tooth face adapted to be cemented to the backing piece $n$ of the abutment end of Fig. 12, while Fig. 15 shows in cross-sectional view a bicuspid tooth face adapted to be cemented to the backing piece $n'$ of Fig. 12. Fig. 14 shows the reverse side of the tooth face adapted to be secured to the backing piece $o$ of Fig. 12. Fig. 14 particularly well illustrates the strength of the porcelain tooth face of my invention which, notwithstanding the facility with which it may be slipped upon and cemented to its backing piece, has but the very small opening $i$ in the broad expanse of the inner side of the tooth face.

My invention provides, furthermore, a construction whereby in bridge work short facings may be replaced with longer ones after the absorption of the gums without the removal of the bridge. It is merely necessary to pull the tooth faces from the prongs, whereupon new ones may be replaced with cement to hold them in position. It will be apparent that the tooth of my invention, owing to its construction, has the advantage that the recess therein is surrounded by the body of the facing. It also can be used universally for plates, bridges or crowns.

Fig. 16 illustrates a modification of my invention wherein the tooth face is intended to form a crown. It is mounted upon a cast crown backing or anchorage *p* provided with the pin *q*, which is held in the root of the patient's tooth in the usual manner. The anchoring of the backing in place upon the metal end of the crown does not differ essentially from that in connection with plate and bridge work previously described, and need not be considered in further detail. This figure shows, however, that the tooth face may be regarded not only as a front, but as the end of the tooth proper. When, therefore, I speak of a tooth facing or tooth front, I mean the various forms which the porcelain part of the construction takes in the various figures shown in the drawings or in similar work not illustrated in detail. So also with respect to the protuberance or stud which is provided upon the back of the metal backing piece, which anchors the backing piece to the casting in the case of plate work, or to the solder with which a piece of bridge work is held together. No particular form is required although I prefer the T-shaped stud shown in the various figures, with the exception of Fig. 11. In Fig. 11, I have shown how a loop or staple-like protuberance *r* may be punched out of the metal of the backing piece proper.

Having thus described in more or less detail the various features of my invention and the manner in which the teeth and backings of my invention are adapted to the various kinds of dental work, it will be apparent that I have provided a simple and easily workable method of making the necessary attachments and mountings, while at the same time I have provided a very strong and effective means not only of attaching the teeth faces to their backings, but also of attaching the backings to mountings of any desired character.

In Figs. 7 and 8 I have illustrated a modified form instead of being L-shaped, the prong is straight and extends obliquely from the backing plate. It will be noted that the part of the porcelain tooth body which extends under the prong is correspondingly wedge shaped, and the result is that a firm attachment, well able to meet strains imposed thereon, is formed.

It would not, of course, be feasible to attempt to describe in detail every possible modification or adaptation of my invention which manifestly is not limited to the precise details of construction or manipulation heretofore described.

What I claim as new and desire to secure by Letters Patent is:

1. In an artificial tooth, the combination of an individual backing plate comprising a thin sheet metal body portion, a metal prong secured to the body portion and conformed so as to extend first in a direction substantially perpendicular to the body portion and then turned sharply to extend in the direction of such body portion, and a metal anchor extending from the rear face of the backing plate having an enlarged head at its outer end connected by a neck of reduced cross-section to the body portion, a tooth facing conformed to fit the front surface of the backing plate and provided with an opening in its rear face which does not extend through the upper surface of the tooth, and a mounting member conformed to the rear face of the individual backing plate to reinforce the same and surrounding the anchor projecting therefrom.

2. As an article of manufacture for artificial tooth structures, an individual backing plate comprising a body portion of thin sheet metal provided with a metal prong extending from its front surface first in a direction substantially perpendicular with the body portion and then turned sharply at an angle to extend substantially parallel with such body portion, and a metal anchor extending from the rear face of the body portion having an enlarged head connected with the body portion by a neck of comparatively small size.

In witness whereof, I hereunto subscribe my name this 15th day of January, A. D., 1910.

FRANCIS A. CARTER.

Witnesses:
HARVEY L. HANSON,
ALBERT G. McCALEB.